US 12,421,385 B2

United States Patent
Yamashita et al.

(10) Patent No.: US 12,421,385 B2
(45) Date of Patent: Sep. 23, 2025

(54) RESIN COMPOSITION

(71) Applicant: TOYOBO MC Corporation, Osaka (JP)

(72) Inventors: Yoji Yamashita, Hyogo (JP); Takuya Yokomichi, Hyogo (JP); Kenji Kashihara, Hyogo (JP)

(73) Assignee: TOYOBO MC CORPORATION, Osaka (JP)

( * ) Notice: Subject to any disclaimer, the term of this patent is extended or adjusted under 35 U.S.C. 154(b) by 704 days.

(21) Appl. No.: 17/763,866

(22) PCT Filed: Sep. 8, 2020

(86) PCT No.: PCT/JP2020/033983
§ 371 (c)(1),
(2) Date: Mar. 25, 2022

(87) PCT Pub. No.: WO2021/059969
PCT Pub. Date: Apr. 1, 2021

(65) Prior Publication Data
US 2022/0340748 A1 Oct. 27, 2022

(30) Foreign Application Priority Data
Sep. 27, 2019 (JP) ................. 2019-176943

(51) Int. Cl.
| C08L 51/06 | (2006.01) |
|---|---|
| C08F 222/06 | (2006.01) |
| C08J 5/04 | (2006.01) |
| C08L 9/06 | (2006.01) |
| C08L 23/0807 | (2025.01) |
| C08L 51/04 | (2006.01) |

(52) U.S. Cl.
CPC ............ C08L 51/06 (2013.01); C08F 222/06 (2013.01); C08J 5/043 (2013.01); C08L 9/06 (2013.01); C08L 23/0815 (2013.01); C08L 51/04 (2013.01)

(58) Field of Classification Search
None
See application file for complete search history.

(56) References Cited

U.S. PATENT DOCUMENTS

| 4,146,529 A | 3/1979 | Yamamoto et al. |
| 4,882,389 A | 11/1989 | Doi et al. |
| 2016/0355628 A1* | 12/2016 | Yoshimoto ............ C08F 255/02 |
| 2017/0321019 A1 | 11/2017 | Fujita et al. |
| 2018/0079887 A1* | 3/2018 | Chino .................... C08J 3/005 |
| 2018/0230629 A1* | 8/2018 | Richeson ............. D04H 1/4291 |

FOREIGN PATENT DOCUMENTS

| CN | 105131203 | 12/2015 |
|---|---|---|
| CN | 106117445 | 11/2016 |
| CN | 107148445 | 9/2017 |
| CN | 108892752 | 11/2018 |
| CN | 109535327 | 3/2019 |
| EP | 0 459 766 | 5/1991 |
| JP | 55-50040 | 4/1980 |
| JP | 63-172715 | 7/1988 |
| JP | 2-97550 | 4/1990 |
| JP | 5-59254 | 3/1993 |
| JP | 7-173229 | 7/1995 |
| JP | 7-316239 | 12/1995 |
| JP | 8-127697 | 5/1996 |
| JP | 08143739 A * | 6/1996 |
| JP | 9-59448 | 3/1997 |
| JP | 9-59449 | 3/1997 |
| JP | 2632980 | 7/1997 |
| JP | 2001-247760 | 9/2001 |
| JP | 2002-187922 | 7/2002 |
| JP | 2007-126553 | 5/2007 |
| JP | 2010-53332 | 3/2010 |
| JP | 2016-6245 | 1/2016 |
| JP | 2018-44023 | 3/2018 |
| WO | 2010/119480 | 10/2010 |

OTHER PUBLICATIONS

International Search Report issued Dec. 1, 2020 in International (PCT) Application No. PCT/JP2020/033983.
Yang Mingbo et al., "Plastic Molding Technology", China Light Industry Press, National Top 100 Book Publishing House3rd Edition, pp. 156-160, 2014, with translation.
Extended European Search Report issued Aug. 29, 2023 in corresponding European Patent Application No. 20870204.3.

\* cited by examiner

*Primary Examiner* — Anthony J Frost
(74) *Attorney, Agent, or Firm* — Wenderoth, Lind & Ponack, L.L.P.

(57) ABSTRACT

This invention provides a modified polyolefin resin composition that contains a large amount of an unsaturated carboxylic acid or an anhydride thereof, and that can inhibit an increase in fluidity after graft modification due to little influence of a reaction residue, wherein the resin composition when used as a compatibilizer for reinforced fiber plastics provides a molded article with excellent mechanical properties such as bending strength and impact resistance.

8 Claims, No Drawings

RESIN COMPOSITION

TECHNICAL FIELD

The present invention relates to a resin composition, and more specifically to a modified propylene-based resin composition.

BACKGROUND ART

Polyolefin materials, such as polypropylene and polyethylene, are used in various industrial fields because of their easy availability and excellent molding processability. However, since polyolefins do not contain a polar group in their molecules, they are chemically inert, and thus extremely difficult to paint or bond. Against such a problem, acid-modified polyolefin resins have been proposed as paint pretreatment agents, adhesives, or compatibilizers.

Modification of polyolefin resins by introducing a polar group by graft modification with an unsaturated carboxylic acid such as a maleic anhydride or a derivative thereof has been well known, and widely practiced. As a method of grafting an unsaturated carboxylic acid derivative and anhydride thereof onto a polyolefin, a grafting reaction using a graft initiator such as an organic peroxide is known. However, due to the low grafting efficiency of the unsaturated carboxylic acid or derivative thereof, the conventional method produces a large amount of reaction residue, which reduces the physical properties of a graft modified product.

Accordingly, Patent Literature 1 proposes a method of performing a radical reaction in the presence of added rubber. Patent Literature 2 proposes graft modification in the co-presence of solid rubber and an unsaturated aromatic monomer.

CITATION LIST

Patent Literature

PTL 1: JP1980-50040A
PTL 2: Japanese Patent No. 2632980

SUMMARY OF INVENTION

Technical Problem

However, although in the method described in Patent Literature 1, the amount (addition amount) of unsaturated carboxylic acid grafted is improved, separate addition of a graft monomer and a radical generator requires a long reaction time, leading to a problem in terms of economic efficiency and profitability. Moreover, an unreacted residue of rubber having a low molecular weight is present, and the fluidity (melt flow rate) significantly increases between before and after graft modification, resulting in a problem of reduced physical properties, such as poor adhesion to or poor compatibility with olefin resins. In the method described in Patent Literature 2, the amount of unsaturated carboxylic acid grafted did not even reach 1.0 mass %, leading to a problem of poor compatibility with glass fibers.

An object of the present invention is to provide a modified polyolefin resin composition that contains a large amount of an unsaturated carboxylic acid or an anhydride thereof, and that can inhibit an increase in fluidity after graft modification due to little influence of a reaction residue, and that, wherein the resin composition when used as a compatibilizer for reinforced fiber plastics provides a molded article with excellent mechanical properties such as bending strength and impact resistance.

Solution to Problem

To solve the above problems, the present inventors conducted extensive research and found a modified polyolefin resin composition that contains a specific diene-based elastomer, has a high content of an unsaturated carboxylic acid or anhydride thereof, and has less change in fluidity after graft modification due to little influence of a reaction residue, and has excellent physical properties and compatibility. Thus, the present invention was proposed. Specifically, the present invention includes the following structure.

A resin composition comprising a copolymer of a propylene-based polymer (A), a diene-based elastomer (B), and an unsaturated carboxylic acid or anhydride thereof (C), wherein the content of the unsaturated carboxylic acid or anhydride thereof (C) in the resin composition is 2.0 mass % or more, the melt mass flow rate of the resin composition measured at 190° C./2.16 kg as defined in JIS K 7210 is 2 g/10 min or more and 500 g/10 min or less, and a reaction residue derived from the unsaturated carboxylic acid or anhydride thereof (C) in the resin composition is less than 2.0 mass %.

The resin composition preferably contains a volatile hydrocarbon compound in an amount of 0.5 mass % or less.

The number average molecular weight of the diene-based elastomer (B) is preferably 50,000 or more, and the content of the diene-based elastomer (B) is preferably 5 to 50 parts by mass relative to 100 parts by mass of the propylene-based polymer (A).

The resin composition according to any of the foregoing, further comprising a glass fiber.

A compatibilizer comprising the resin composition according to any of the foregoing.

A compatibilizer for glass fiber-reinforced plastics comprising the resin composition according to any of the foregoing.

A fiber-reinforced plastic comprising the compatibilizer as described above.

Advantageous Effects of Invention

The resin composition of the present invention has excellent compatibility with reinforcing fibers such as carbon fibers and glass fibers because of a high content of an unsaturated carboxylic acid or anhydride thereof. For example, when the resin composition is used as a compatibilizer for glass fiber-reinforced plastics, mechanical properties such as impact resistance and bending strength of a molded article are improved. Further, the resin composition has high processability, and contains a reaction residue and a volatile hydrocarbon compound in a small amount, which reduces odor.

DESCRIPTION OF EMBODIMENTS

The embodiments of the present invention are detailed below.

Propylene-Based Polymer (A)

There is no limitation on the propylene-based polymer (A) used in the present invention; however, a homopolypropylene or propylene-α-olefin copolymer can be used.

The propylene-based polymer (A) preferably contains a propylene component in an amount of 40 mol % or more, more preferably 50 mol % or more, even more preferably 60 mol % or more, and particularly preferably 70 mol % or more. The higher the propylene content, the better the compatibility with the polypropylene resin when the propylene-based polymer is used as a compatibilizer.

The propylene-α-olefin copolymer is obtained by copolymerizing an α-olefin with propylene as a main material. As the α-olefin, ethylene, 1-butene, 1-heptene, 1-octene, 4-methyl-1-pentene, and vinyl acetate can be used singly or in combination. Of these α-olefins, ethylene and 1-butene can be preferably used, and 1-butene can be more preferably used.

The melting point of the propylene-based polymer (A) is preferably 70° C. or more and 170° C. or less, more preferably 120° C. or more, and even more preferably 140° C. or more. The higher the melting point, the higher the crystallinity, which increases the mechanical strength of a molded product when the resin composition is mixed with polypropylene as a compatibilizer.

The melt mass flow rate of the propylene-based polymer (A) is preferably 1 g/10 min or more and 100 g/10 min or less, more preferably 50 g/10 min or less, and even more preferably 20 g/10 min or less. When the melt mass flow rate is 100 g/10 min or more, granulation in producing the resin composition of the present invention becomes difficult.

Diene-Based Elastomer (B)

There is no limitation on the diene-based elastomer (B) used in the present invention; however, the diene-based elastomer (B) is a polymer comprising a diene compound as a main component, and has a double bond in the main chain. Examples of the diene-based elastomer (B) include acrylonitrile butadiene-based elastomers, butadiene isoprene copolymers, styrene isoprene copolymers, butadiene pentadiene copolymers, styrene butadiene elastomers, styrene butadiene copolymers, polychloroprene, polyisoprene, and polybutadiene. Preferably, styrene-butadiene copolymers and polybutadiene can be used.

The diene-based elastomer (B) must have a number average molecular weight of 50000 or more, preferably 70000 or more, and more preferably 80000 or more. By setting the number average molecular weight of the diene-based elastomer (B) to 50000 or more, the resin composition has excellent processability and a molded article obtained by using the resin composition as a compatibilizer for glass fiber-reinforced plastics has excellent mechanical properties such as impact resistance. The upper limit of the number average molecular weight is preferably 300000 or less, and more preferably 200000 or less. When the value is equal to or less than the above value, the dispersibility with the propylene-based copolymer (A) becomes excellent, and the addition amount of the unsaturated carboxylic acid or anhydride thereof to the resin composition becomes uniform, which increases adhesion to polyolefin resins. The use of the diene-based elastomer having a number average molecular weight as low as less than 50000 is not desirable because of the possibility of poor adhesion to and poor compatibility with olefin resins.

The content of the diene component in the diene-based elastomer (B) is preferably 30 mass % or more and 100 mass % or less, more preferably 35 mass % or more, and even more preferably 40 parts by mass or more. In particular, a polybutadiene elastomer is most preferred from the viewpoint of attaining high acid addition.

The melting point (Tm) of the diene-based elastomer (B) is preferably 50° C. or more and 120° C. or less, more preferably 60° C. or more, and even more preferably 80° C. or more. A diene-based elastomer (B) having a melting point of 120° C. or more causes incompatibility due to poor melting during kneading in an extruder, which may reduce the physical properties of the modified polyolefin resin composition and acid addition.

These diene-based elastomers (B) can be used alone or in a combination of two or more.

Unsaturated Carboxylic Acid or Anhydride Thereof (C)

The unsaturated carboxylic acid or anhydride thereof (C) used in the present invention is a compound having both a C=C unsaturated bond in the molecule and a carboxylic acid group or acid anhydride group thereof. The resin composition can provide compatibility with glass fibers because it has a carboxylic acid group or an acid anhydride group thereof. Further, having an unsaturated bond makes the propylene-based polymer (A) and the diene-based elastomer (B) copolymerizable.

There is no particular limitation on the unsaturated carboxylic acid or anhydride thereof (C), as long as it has both an unsaturated bond and a carboxylic acid group or anhydride group thereof as described above. Examples include acrylic acid, methacrylic acid, nasic acid, crotonic acid, isocrotonic acid, norbornenedicarboxylic acid, maleic acid, itaconic acid, citraconic acid, and acid anhydrides thereof. Of these, maleic acid is preferred, an acid anhydride is more preferred, and a maleic anhydride is even more preferred.

Resin Composition

The resin composition of the present invention contains a reaction product obtained by reacting a propylene-based polymer (A), a diene-based elastomer (B), and an unsaturated carboxylic acid or an anhydride thereof (C), wherein the content of the unsaturated carboxylic acid or the anhydride thereof (C) in the resin composition is 2.0 mass % or more of the entire resin composition, and the melt mass flow rate of the resin composition measured at 190° C./2.16 kg as defined in JIS K 7210 is 2 g/10 min or more and 500 g/10 min or less, and the content of the reaction residue derived from the unsaturated carboxylic acid or anhydride thereof (C) in the resin composition is less than 2.0 mass % of the entire resin composition.

The reaction product comprises a copolymer comprising at least a propylene-based polymer (A), a diene-based elastomer (B), and an unsaturated carboxylic acid or anhydride thereof (C), and may further comprise a copolymer of the propylene-based polymer (A) and the unsaturated carboxylic acid or anhydride thereof (C), and/or a copolymer of the diene-based elastomer (B) and the unsaturated carboxylic acid or anhydride thereof (C). The resin composition of the present invention contains 98.0 mass % or more of the reaction product and less than 2.0 mass % of a reaction residue derived from the unsaturated carboxylic acid or anhydride thereof (C).

The resin composition of the present invention must contain the unsaturated carboxylic acid or anhydride thereof (C) in an amount of 2.0 mass % or more, preferably 4.0 mass % or more, and more preferably 5.0 mass % or more. By setting the amount of the unsaturated carboxylic acid or anhydride thereof (C) to the above value or more, the compatibility with glass fibers can be improved; moreover, physical properties such as elongation modulus, bending modulus, and impact resistance obtained when the resin composition is used as a compatibilizer for glass fiber-reinforced plastics can be improved. The content of the unsaturated carboxylic acid or anhydride thereof (C) is preferably 15.0 mass % or less, and more preferably 10.0 mass % or less. When the content of the unsaturated carboxylic acid or anhydride thereof (C) is 15.0 mass % or less, high compatibility with polyolefins, in particular, high compatibility with polypropylene can be attained, and mechanical properties when the resin composition is used as a compatibilizer for glass fiber-reinforced plastics are improved.

The content of the reaction residue derived from the unsaturated carboxylic acid or anhydride thereof (C) in the resin composition of the present invention is less than 2.0 mass %, and preferably less than 1.5 mass %. If the content of the reaction residue is 2.0 mass % or more, when the resin composition is used as a compatibilizer for glass fiber-reinforced plastics, mechanical properties such as elongation modulus, bending modulus, and impact resistance is reduced due to the reaction residue. By incorporating the diene-based elastomer, the reaction efficiency of the unsaturated carboxylic acid or anhydride thereof (C) is improved, which can reduce the reaction residue.

The resin composition of the present invention has a melt mass flow rate of 2 g/10 min or more and 500 g/10 min or less at 190° C./2.16 kg as defined in JIS K 7210, preferably 300 g/10 min or less, and more preferably 280 g/10 min or less. The melt mass flow rate is preferably 50 g/10 min or more, more preferably 80 g/10 min or more, and even more preferably 105 g/10 min or more. By setting the melt mass flow rate to 500 g/10 min or less, when the resin composition is used as a compatibilizer for glass fiber-reinforced plastics, the adhesion strength between the matrix and glass interface is increased, which increases mechanical properties such as adhesion strength, bending strength, and impact resistance. Setting the melt mass flow rate to the above value or less facilitates granulation, and is thus preferred.

The resin composition of the present invention preferably contains a volatile hydrocarbon compound in an amount of 0.5 mass % or less, preferably 0.3 mass % or less, and more preferably 0.1 mass % or less. By setting the content of the volatile hydrocarbon compound in the resin composition to 0.5 mass % or less, when the resin composition is, for example, used as a compatibilizer for glass fiber-reinforced plastics, reduction in mechanical properties due to the volatile hydrocarbon compound can be inhibited. If the content of the volatile hydrocarbon compound is 1.0 mass % or more, not only mechanical properties when the resin composition is used as a compatibilizer for glass fiber-reinforced plastics but also heat resistance will be reduced.

The resin composition of the present invention preferably contains the diene-based elastomer (B) in an amount of 5 to 50 mass %, more preferably 5 to 40 mass %, and even more preferably 10 to 20 mass %, relative to the total amount of the propylene-based polymer (A) and the diene-based elastomer (B). By setting the content of the component of the diene-based elastomer (B) to 5 mass % or more, mechanical properties such as impact resistance when the resin composition is used as a compatibilizer for glass fiber-reinforced plastics are improved. When the content of the component of the diene-based elastomer (B) is 50 mass % or less, the resin composition when used as a compatibilizer for glass fiber-reinforced plastics has excellent compatibility with PP (matrix), which increases mechanical properties.

In addition to the copolymer of the propylene-based polymer (A), the diene-based elastomer (B), and the unsaturated carboxylic acid or anhydride thereof (C), the resin composition of the present invention may further comprise glass fibers. The resin composition of the present invention can be used as a compatibilizer, and the compatibilizer containing the resin composition of the present invention is preferably used as a compatibilizer for glass fiber-reinforced plastics.

Production Method of Resin Composition

The method for producing the resin composition of the present invention is not particularly limited, and examples include a radical grafting reaction in which a radical species is formed in a polymer serving as a main chain, and an unsaturated carboxylic acid and acid anhydride are graft-polymerized using the radical species as a polymerization starting point.

Examples of radical generators include, but are not limited to, organic peroxides and azonitriles, with organic peroxides being preferred. Examples of organic peroxides include, but are not limited to, di-tert-butylperoxy phthalate, tert-butyl hydroperoxide, dicumyl peroxide, benzoyl peroxide, tert-butyl peroxy benzoate, tert-butyl peroxy-2-ethylhexanoate, tert-butyl peroxy pivalate, methyl ethyl ketone peroxide, di-cert-butyl peroxide, lauroyl peroxide, and 2,5-dimethyl-2,5-di(tert-butyl propyl)hexane. Examples of azonitriles include azobisisobutyronitrile and azobisisopropionitrile.

Compatibilizer

The resin composition of the present invention can be used as a compatibilizer. The compatibilizer of the present invention can be used for polyolefin resins such as polypropylene and polyethylene; polyethylene terephthalate; nylon; polycarbonate; and matrix resins such as epoxy resins and phenolic resins. Of these, polyolefin resins can be suitably used, and polypropylene resins can be more preferably used. Usable examples of filler species include, glass fibers, carbon fibers, fiber-reinforced plastics, talc, wood powder, and the like. Of these, glass fibers and plastic fibers are preferred, and glass fibers are particularly preferred.

The glass fiber-reinforced plastic containing the compatibilizer of the present invention preferably contains 40 to 95 mass % of the matrix resin, 5 to 60 mass % of the glass fiber, and 1 to 10 mass % of the compatibilizer of the present invention, relative to the total amount of the matrix resin, the glass fiber, and the compatibilizer of the present invention. By setting the each content within the above range, the resin composition exhibits high compatibility with the polyolefin resin and the glass fiber, ensuring excellent kneadability of the resin composition, the polyolefin resin, and the glass fiber.

The glass fiber-reinforced plastic containing the compatibilizer of the present invention is used for home appliances and automobile parts.

EXAMPLES

The present invention is further described in more detail with reference to the examples below. However, the present invention is not limited to the examples.

Preparation of Test Piece

A resin composition (P-1) (2 parts by mass), 58 parts by mass of polypropylene (J-700GP produced by Prime Polymer Co., Ltd.), and 40 parts by mass of glass fiber (ECS03-631K produced by Central Glass Co., Ltd.) were supplied to an extrusion molding machine (LABOTEX30HSS produced by NSK Co., Ltd.) to perform granulation. Thereafter, injection molding was performed using an injection-molding machine (device: TI-30F6 produced by Toyo Machinery & Metal Co., Ltd.) under the conditions of an injection temperature of 190° C. and a molding temperature of 30° C. to form a multi-purpose test piece (Type A1) (Test Specimen 1) as described in JIS K 7139:2009 (ISO 20753).

For each of the resin compositions of Examples 2 to 7 and Comparative Examples 1 to 7, corresponding test pieces were also prepared and tested.

Evaluation of Elongation Strength

The elongation strength was evaluated using the test pieces prepared above. The evaluation method is based on the method defined in JIS K 7161:2014 (ISO 527-1). Each test piece has a thickness of 3.0 mm, and the elongation strength is evaluated under conditions such that the distance between chucks is 50 mm and the elongation speed is 1.0 ram/min. The measurement temperature is 23° C. unless otherwise specified.

Evaluation Criteria
  A: Significantly excellent (70 MPa or more)
  B: Excellent (60 MPa or more and less than 70 MPa)
  C: Practicable (50 MPa or more and less than 60 MPa)
  D: Impractical (less than 50 MPa)

Evaluation of Bending Strength

The ends of the test pieces produced above were cut using a processing machine (Notching Tool A produced by Toyo Seiki Co., Ltd.) to produce strip test pieces (80 mm×10 mm×3 mm), and the bending strength was evaluated. The evaluation method is based on the method defined in JIS K 7171:2016 (ISO 178:2010). The bending strength was evaluated under conditions such that the span length was 48 mm and the loading rate was 1.0 mm/min. The measurement temperature is 23° C. unless otherwise specified.

Evaluation Criteria
  A: Significantly excellent (100 MPa or more)
  B: Excellent (90 MPa or more and less than 100 MPa)
  C: Practicable (80 MPa or more and less than 90 MPa)
  D: Impractical (less than 80 MPa)

Evaluation of impact Resistance

The ends of the test pieces produced above were cut using a processing machine (Notching Tool A produced by Toyo Seiki Co., Ltd.) to produce notched strip test pieces (80 mm×10 mm×3 mm, notch depth: 2 mm), and the impact resistance test was performed. The evaluation method is based on the Izod impact test method defined in JIS K 7110:1999 (ISO 180).

Evaluation Criteria
  A: Significantly excellent (7 kJ/m or more)
  B: Excellent (6 kJ/m or more and less than 7 kJ/m)
  C: Practicable (5 kJ/m or more and less than 6 kJ/m)
  D: Impractical (less than 5 kJ/m)

Content of Unsaturated Carboxylic Acid or Acid Anhydride Thereof

The content of unsaturated carboxylic acid or acid anhydride thereof is the value calculated according to the following equation using the coefficient (f) obtained from the calibration curve prepared using a chloroform solution of maleic anhydride (Tokyo Chemical Industry Co., Ltd.) with FT-IR (FT-IR8200PC produced by Shimadzu Corporation), and the absorbance (I) of elongation peak (1780 cm$^{-1}$) of carbonyl (C=O) bonding of maleic anhydride in a sample, wherein the sample is each of the resin composition samples after acetone washing, which is used as a 10 mass % toluene solution sample.

Content of unsaturated carboxylic acid or acid anhydride thereof [mass %]=[absorbance (*I*)×coefficient (*f*)×100/sample concentration (%)]

The content of a reaction residue derived from the unsaturated carboxylic acid or anhydride thereof (C) in the resin composition of the present invention was measured according to the following "Low Molecular Weight Content" section.

Low Molecular Weight Content

Each of the resin composition samples was fully washed with acetone at 90° C. for 2h to extract a reaction residue. The acetone extract was transferred into a flask and concentrated to dryness at 100° C. in vacuum. The weight of a dry component was calculated by subtracting the weight of the flask before the acetone extract was transferred from the flask containing the extract that was concentrated to dryness. The low molecular weight content of the present invention is a value calculated according to the following formula.

Low molecular weight content [mass %]=[weight of dry component/weight of resin before acetone washing]×100

Melt Mass Flow Rate

The melt mass flow rate is measured based on the method defined in JIS K6758. The measurement temperature was 190° C., and the measurement was conducted at a load of 2.16 kg unless otherwise specified.

Number Average Molecular Weight (Mn)

The number average molecular weight was measured by GPC using THF as an eluent and an Alliance e2695 gel permeation chromatograph produced by Nihon Waters Corporation (hereafter referred to as GPC, standard material: polystyrene resin, mobile phase: tetrahydrofuran, column: Shodex KF-806+KF-803, column temperature: 40° C., flow rate: 1.0 ml/min, detector: Photodiode array detector (wavelength: 254 nm=UV ray)).

Content of Volatile Hydrocarbon Compound

Each of the resin composition samples was allowed to stand at 210° C. for 1 hour. The content of a volatile hydrocarbon compound is a value calculated from the remaining weight. Content of volatile hydrocarbon compound [mass %]=[(the weight of resin before being allowed to stand−the weight of resin after being allowed to stand)/the weight of resin before being allowed to stand]×100

Example 1

One hundred parts by mass of polypropylene (A-1), 15 parts by mass of diene-based elastomer (B-1), 8 parts by mass of maleic anhydride, and 2 parts by mass of di-tert-butyl peroxide were added to a twin-screw extruder (TEM-26SX) equipped with a supply part, a compression part, and a measuring part, produced by Toshiba Machine. The reaction was performed at 160° C. After the unreacted maleic anhydride and the reaction decomposition product of di-tert-butyl peroxide in a degassing part were removed, a resin composition (P-1) was obtained. The property values and the property evaluation results of P-1 are shown in Table 1.

Example 2

The same procedure as in Example 1 was performed except that the amount of the maleic anhydride used in Example 1 was changed to 4 parts by mass, thus obtaining a resin composition (P-2). The evaluation results are shown in Table 1.

Example 3

The same procedure as in Example 1 was performed except that the amount of the maleic anhydride used in Example 1 was changed to 16 parts by mass, thus obtaining a resin composition (P-3). The evaluation results are shown in Table 1.

Example 4

The same procedure as in Example 1 was performed except that the amount of the di-tert-butyl peroxide used in Example 1 was changed to 1 part by mass, thus obtaining a resin composition (P-4). The evaluation results are shown in Table 1.

Example 5

The same procedure as in Example 1 was performed except that the amount of the di-tert-butyl peroxide used in Example 1 was changed to 4 parts by mass, thus obtaining a resin composition (P-5). The evaluation results are shown in Table 1.

Example 6

The same procedure as in Example 1 was performed except that the supply amount of the diene-based elastomer (B-1) used in Example 1 was changed to 5 parts by mass, thus obtaining a resin composition (P-6). The evaluation results are shown in Table 1.

Example 7

The same procedure as in Example 1 was performed except that the supply amount of the diene-based elastomer (B-1) used in Example 1 was changed to 50 parts by mass, thus obtaining a resin composition (P-7). The evaluation results are shown in Table 1.

TABLE 1

| | Example 1 | Example 2 | Example 3 | Example 4 | Example 5 | Example 6 | Example 7 |
|---|---|---|---|---|---|---|---|
| Resin composition | P-1 | P-2 | P-3 | P-4 | P-5 | P-6 | P-7 |
| Propylene-based polymer (A) | (A-1) | (A-1) | (A-1) | (A-1) | (A-1) | (A-1) | (A-1) |
| (A) Parts by mass | 100 | 100 | 100 | 100 | 100 | 100 | 100 |
| Diene-based elastomer (B) | (B-1) | (B-1) | (B-1) | (B-1) | (B-1) | (B-1) | (B-1) |
| (B) Parts by mass | 15 | 15 | 15 | 15 | 15 | 5 | 50 |
| (C) Parts by mass | 8 | 4 | 16 | 8 | 8 | 8 | 8 |
| Peroxide | 2 | 2 | 2 | 1 | 4 | 2 | 2 |
| Acid component (wt %) | 6.9 | 3 | 8.3 | 6.9 | 6.5 | 6.8 | 6.8 |
| Low molecular weight (wt %) | 1 | 0.9 | 1.9 | 0.8 | 1.3 | 1 | 1.1 |
| MFR (g/10 min) | 249 | 230 | 303 | 50 | 491 | 291 | 35 |
| Volatile hydrocarbon compound (wt %) | 0.3 | 0.2 | 0.3 | 0.3 | 0.3 | 0.4 | 0.5 |
| Elongation strength | A | B | B | B | B | B | C |
| Bending strength | A | B | B | B | B | B | C |
| Impact resistance | A | B | B | B | C | C | B |

For Comparative Examples 1 to 7, resin compositions (P-8) to (P-14) were individually obtained. The evaluation results are shown in Table 2.

Comparative Example 1

The same procedure as in Example 1 was performed except that the amount of the maleic anhydride used in Example 1 was changed to 2 parts by mass, thus obtaining a resin composition (P-8).

Comparative Example 2

The same procedure as in Example 1 was performed except that the amount of the maleic anhydride used in Example 1 was changed to 20 parts by mass, thus obtaining a resin composition (P-9).

Comparative Example 3

The same procedure as in Example 1 was performed except that the amount of the di-tert-butyl peroxide used in Example 1 was changed to 6 parts by mass, thus obtaining a resin composition (P-10).

Comparative Example 4

The same procedure as in Example 1 was performed except that the amount of the maleic anhydride used in Example 1 was changed to 20 parts by mass and the reaction temperature was changed to 140° C., thus obtaining a resin composition (P-11).

Comparative Example 5

The same procedure as in Example 1 was performed except that the diene-based elastomer was changed from (B-1) to (B-2), thus obtaining a resin composition (P-12).

Comparative Example 6

The same procedure as in Example 1 was performed except that the diene-based elastomer was changed to 0 parts by mass, thus obtaining a resin composition (P-13).

Comparative Example 7

The same procedure as in Example 1 was performed except that the diene-based elastomer was changed to 70 parts by mass, thus obtaining a resin composition (P-14).

TABLE 2

| | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Resin composition | P-8 | P-9 | P-10 | P-11 | P-12 | P-13 | P-14 |
| Propylene-based polymer (A) | (A-1) | (A-1) | (A-1) | (A-1) | (A-1) | (A-1) | (A-1) |
| (A) Parts by mass | 100 | 100 | 100 | 100 | 100 | 100 | 100 |
| Diene-based elastomer (B) | (B-1) | (B-1) | (B-1) | (B-1) | (B-2) | (B-1) | (B-1) |
| (B) Parts by mass | 15 | 15 | 15 | 15 | 15 | 0 | 70 |
| (C) Parts by mass | 2 | 20 | 8 | 20 | 8 | 8 | 8 |
| Peroxide | 2 | 2 | 6 | 2 | 2 | 2 | 2 |
| Acid component (wt %) | 1.1 | 8.5 | 6.4 | 5.2 | 5.7 | 2.1 | 7.8 |
| Low molecular weight component (wt %) | 0.7 | 3.3 | 0.9 | 3.5 | 1.8 | 1.4 | 1.0 |
| MFR (g/10 min) | 155 | 245 | 714 | 243 | 555 | 332 | 1.7 |
| Volatile hydrocarbon compound (wt %) | 0.5 | 0.2 | 0.3 | 1.5 | 0.4 | 0.3 | 0.5 |
| Elongation strength | D | B | B | C | D | B | D |
| Bending strength | D | D | D | D | D | B | D |
| Impact resistance | D | D | D | D | B | D | C |

The propylene-based polymer (A) used in each of the Examples and Comparative Examples is as follows.
A-1: Polypropylene (pellet, melt mass flow rate: 9 g/10 min (230° C.))

The diene-based elastomer (B) used in each of the Examples and Comparative Examples is as follows.
B-1: Polybutadiene (pellet, density 0.91 g/cm³, Mn=160,000)
B-2: Liquid polybutadiene (Mn=8,000, viscosity: 15,000 cps)

INDUSTRIAL APPLICABILITY

Since the resin composition of the present invention contains a small amount of a reaction residue of a carboxylic acid compound while having a certain amount of acid addition, and contains a copolymer of a propylene-based polymer, a high-molecular-weight diene-based elastomer, and an unsaturated carboxylic acid or anhydride thereof, the resin composition of the present invention has excellent interfacial adhesion with glass. Accordingly, the resin composition of the present invention can be used as a compatibilizer for glass fiber-reinforced plastics.

The invention claimed is:

1. A resin composition comprising a reaction product obtained by reacting a propylene-based polymer (A), a diene-based elastomer (B), and an unsaturated carboxylic acid or anhydride thereof (C),
wherein
the content of the unsaturated carboxylic acid or anhydride thereof (C) is 2.0 mass % or more of the entire resin composition,
the melt mass flow rate of the resin composition measured at 190° C./2.16 kg as defined in JIS K 7210 is 2 g/10 min or more and 500 g/10 min or less,
the content of a reaction residue derived from the unsaturated carboxylic acid or anhydride thereof (C) is less than 2.0 mass % of the entire resin composition,
the content of a volatile hydrocarbon compound in the resin composition is 0.5 mass % or less of the entire resin composition, and
the content of the diene-based elastomer (B) is more than 10 mass % and 50 mass % or less relative to the total amount of the propylene-based polymer (A) and the diene-based elastomer (B).

2. The resin composition according to claim 1, wherein the diene-based elastomer (B) has a number average molecular weight of 50,000 or more.

3. The resin composition according to claim 1, further comprising a glass fiber.

4. The resin composition according to claim 2, further comprising a glass fiber.

5. A compatibilizer comprising the resin composition according to claim 1.

6. A compatibilizer for glass fiber-reinforced plastics, comprising the resin composition according to claim 1.

7. A fiber-reinforced plastic comprising the compatibilizer according to claim 5.

8. The resin composition according to claim 1, wherein the content of a diene component in the diene-based elastomer (B) is 30 wt % or more and 100 wt % or less.

* * * * *